Feb. 11, 1958 I. BOERS 2,823,259

DEVICE FOR CARRIER WAVE TELEGRAPHY

Filed April 19, 1954 4 Sheets-Sheet 1

INVENTOR.
IJSBRAND BOERS
BY
Fred M. Vogel
AGENT

Feb. 11, 1958 I. BOERS 2,823,259

DEVICE FOR CARRIER WAVE TELEGRAPHY

Filed April 19, 1954 4 Sheets-Sheet 2

INVENTOR
IJSBRAND BOERS

BY Fred M Vogel
AGENT

INVENTOR.
BY IJSBRAND BOERS
Fred M. Vogel
AGENT.

Feb. 11, 1958 I. BOERS 2,823,259

DEVICE FOR CARRIER WAVE TELEGRAPHY

Filed April 19, 1954 4 Sheets-Sheet 4

INVENTOR
IJSBRAND BOERS

BY Fred M Vogel

AGENT

United States Patent Office 2,823,259

Patented Feb. 11, 1958

2,823,259

DEVICE FOR CARRIER WAVE TELEGRAPHY

Ijsbrand Boers, Hilversum, Netherlands, assignor, by mesne assignments, to North American Philips Company, Inc., New York, N. Y., a corporation of Delaware

Application April 19, 1954, Serial No. 424,216

Claims priority, application Netherlands May 30, 1953

9 Claims. (Cl. 178—51)

The invention relates to a device for carrier-wave telegraphy for the transmission of telegraphy channels, distributed in a speech-frequency band and divided into four groups lying in successive group-frequency bands. In order to provide a maximum number of telegraphy channels in the available speech-frequency band having a width of, for example 0.3 to 3 or 4 kc./s., it is important to reduce the bandwidth of the successive telegraphy channels to a minimum value, for example of 100 to 120 C./S. The telegraphy signals may be transmitted in various ways, for example by amplitude modulation, frequency shift and the like.

In a known telegraphy system of the kind described above each of the individual channels is provided with an oscillator circuit controlled in the rhythm of the telegraphy signals and an associated channel filter, the said channel oscillator supplying carrier-wave frequencies lying directly in the group-frequency bands concerned. On the receiver side the telegraphy signals modulating different carrier-wave frequencies are supplied for frequency selection in parallel combination to channel filters and, subsequent to demodulation, to the recording device concerned, for example a reproducing relay. It has been found that this telegraphy system gives rise to difficulties in practice, inter alia in the construction of the channel filters, since on the one hand channel filters for very low frequencies of, for example 400 to 600 C./S. are extremely bulky and costly and on the other hand channel filters for the higher frequencies of for example 3000 to 3300 C./S. require particular measures to ensure the desired selectivity.

The invention has for its object to provide a particularly advantageous carrier-wave telegraphy system of the kind described in the preamble, in which inter alia the filters employed may be constructed in a particularly simple manner.

According to the invention the individual channels on the transmitter side associated with the two central bands of the four group-frequency bands are each provided with channel oscillators which supply directly the carrier-wave frequencies lying in these bands and are directly coupled through associated channel filters to the transmitter output, whilst the individual channels associated with the extreme lower frequency bands comprise channel oscillators and associated channel filters, these channel oscillators supplying the carrier-wave frequencies in the higher central frequency band, these individual channels being connected to a group modulator with an associated group oscillator supplying a frequency exceeding the central frequency bands, the output circuit of this group modulator being connected through a group filter having a passband corresponding to the extreme lower frequency band to the transmitter output, whilst the individual channels associated with the higher extreme frequency band comprise channel oscillators and channel filters associated herewith, these channel oscillators supplying the frequencies within the lower central frequency-band, these individual channels being connected to a group modulator with a group oscillator associated herewith, supplying a frequency exceeding the central frequency bands, the output circuit of this group modulator being connected through a group filter having a passband corresponding to the higher extreme frequency band to the output of the transmitter.

According to the invention the associated receiver has the feature that the individual channels associated with the central group-frequency bands comprise channel filters tuned to carrier-wave frequencies lying in these frequency bands, these filters being connected directly to the receiver input, whilst the individual channels associated with the lower extreme frequency band comprise channel filters tuned to the carrier-wave frequencies lying in the higher central frequency band, these individual channels being connected to the output circuit of a group demodulator associated with a group oscillator supplying a frequency exceeding the central frequency bands, the input circuit of this group demodulator being connected through a group filter having a passband corresponding to the lower extreme frequency band to the input of the receiver, whilst the individual channels associated with the higher extreme frequency band comprise channel filters tuned to carrier-wave frequencies lying in the lower central frequency band, these individual channels being connected to the output circuit of a group demodulator associated with a group oscillator supplying a frequency exceeding the central frequency bands, the input circuit of which group demodulator is connected through a group filter having a passband corresponding to the higher extreme frequency band to the input of the receiver.

The invention and its advantages will now be described more fully with reference to the figures of the drawing.

Figure 1:
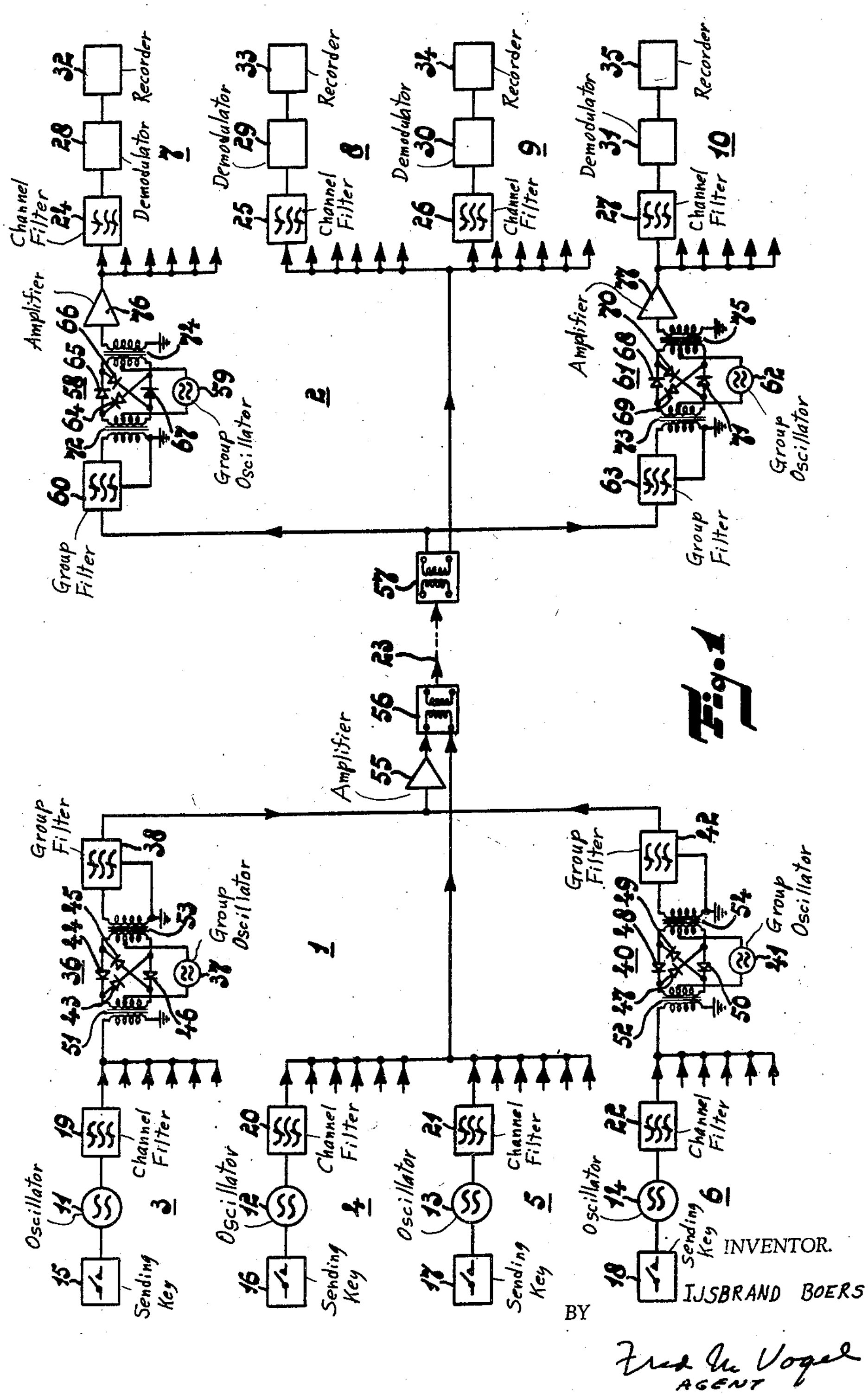
Fig. 1 shows a telegraphy system according to the invention, comprising a transmitting device and a receiving device cooperating therewith.

Fig. 1 shows a 24-channel carrier-wave telegraphy system according to the invention, comprising a transmitter 1 and a receiver 2 for the transmission of transmitting channels distributed in a speech-frequency band and for receiving channels respectively, divided into four groups of six channels each, lying in successive group-frequency bands, the groups of transmitting channels and the groups of receiving channels being designated by 3–6 and 7–10 respectively.

The constructions of the transmitting channels and the receiving channels are identical; therefore only the first channel of each group is shown diagrammatically in the figure.

Each transmitting channel comprises an oscillator 11–14, a sending key 15–18, for example for producing telegraphic signals characterized by frequency shifts and a channel filter 19–22, the telegraphic signals initiating from the various channels being supplied in common to a transmitting cable 23. On the receiver side the telegraphic signals modulated on the various carrier-wave frequencies are supplied through channel filters 24–27 to demodulating devices 28–31, the output voltage of which controls a recording device 32–25, for example, a reproducing relay.

Fig. *5a* shows the positions of the carrier wave frequencies associated with the various transmitting channels in the frequency band from 420 to 3180 C./S., these frequencies having a relative difference of 120 C./S. In this case each time six successive carrier-wave frequencies are united in one group, so that the various channels 3, 7; 4, 8; 5, 9; 6, 10 comprise carrier-wave frequencies of 420 C./S.–1020 C./S., 1140 C./S.–1740 C./S., 1860 C./S.–2460 C./S. and 2580 C./S.–3180 C./S.

According to the invention the individual channels 12 and 13 of the transmitting device shown, associated with the two central group-frequency bands comprise channel oscillators supplying directly the carrier-wave frequencies of these bands i. e. 1140 C./S. to 1740 C./S. and 1860 C./S. to 2460 C./S. and being connected directly through the associated channel filters 20, 21 to the output of the transmitter, whilst the individual channels associated with the lower extreme frequency band comprise channel oscillators 11 supplying carrier-wave frequencies of 1860 C./S. to 2460 C./S., respectively, lying within the higher central frequency band and the channel filters 19, associated therewith, these individual channels being connected to a group modulator 36 and a group oscillator 37, associated therewith, supplying a frequency exceeding the central frequency bands, the output circuit of the group modulator 36 being connected through a group filter 38 having a passband corresponding to the lower extreme frequency band to the output of the transmitter, whilst the individual channels associated with the higher extreme frequency band comprise channel oscillators 14, supplying frequencies of 1140 C./S. to 1740 C./S., respectively, lying within the lower central frequency band, and the channel filters 22, associated therewith, these individual channels being connected to a ground modulator and a group oscillator 41, associated therewith, supplying a frequency exceeding the central frequency bands, the output circuit of this group modulator 40 being connected through a group filter 42, having a passband corresponding to the higher extreme frequency band, to the output of the transmitter.

The channel filters 19 to 22 employed, each having a passband of 120 C./S., are tuned to frequencies within the medium frequency band of about 1100 C./S. to 2500 C./S.; this frequency range permits providing a simple and cheap construction of channel filters having the selectivity referred to above; there is moreover the advantage that with these frequencies the dimensions of the channel filters 19 to 22 are found to be comparatively small.

In the arrangement shown the frequencies of the groups of channels 3 and 6 associated with the extreme high and extreme low frequency bands are made equal to the frequencies of the groups of channels 5 and 4 respectively, associated with the central frequency bands, so that the number of different types of channels is reduced by a factor of 2. At the channel filters 19, 22 of the groups of channels 3 and 6 occur the carrier-wave frequencies of 1140 C./S. to 1740 C./S. and 1860 C./S. to 2460 C./S. respectively (Fig. *5b*), which supply, by modulation in group modulators 36 and 40 respectively, having group carrier-wave frequencies of 2880 and 4320 C./S. respectively, the carrier-wave frequencies of 420 C./S. to 1020 C./S. and 2580 C./S. to 3180 C./S. respectively, associated with the higher extreme frequency and the lower extreme frequency band respectively (cf. Fig. *5c*).

In the arrangement shown the group modulators are constituted by ring modulators comprising four rectifying cells 43 to 46 and 47 to 50, connected between the ends of the secondary windings of the input transformers 51 and 52 respectively and the ends of the primary windings of the output transformers 53 and 54 respectively, the output voltage of the group oscillators 37 and 41 respectively being supplied to the central tappings of the said transformer windings, the primary windings of the input transformers 51 and 52 respectively being coupled with the output circuits of the channel groups 3 and 6 respectively.

Upon modulation of the frequencies of 1860 C./S. to 2460 C./S. with the group oscillator frequency of 2880 C./S. not only the desired difference frequencies of 420 C./S. to 1020 C./S. but also mainly the sum frequencies of 4740 C./S. to 5340 C./S. and the input voltage of 1860 C./S. to 2460 C./S. occur across the output circuit of the ring modulator 36; these frequencies are supplied together to the group filter 38. The frequency interval between desired frequencies and undesirable frequencies across the output circuit of the ring modulator is sufficient for a very simple group filter to provide an attenuation of for example 30 to 40 db of the undesirable frequencies. It should be noted here that with the use of the ring modulator 36 the interfering frequencies of 1860 C./S. to 2460 C./S., which correspond to the carrier-wave frequencies of the channel group 5 associated with the higher central frequency band are subjected to an additional attenuation of for example 20 to 30 db.

In a similar manner as explained above the output circuit of the group filter 42 has produced across it the carrier-wave frequencies associated with the higher extreme frequency band of 2580 C./S. to 3180 C./S., these frequencies being supplied with the output voltage of the group filter 38 to the input circuit of an amplifier 55. The output voltages of the amplifier 55 and of the channel groups 4, 5 are supplied to the transmitting cable 23 through a matching transformer 56, constructed in the form of a hybrid transformer and causing the decoupling of the output circuit of the amplifier 55 and of the channel groups 4, 5.

On the receiver side the incoming signals are supplied to a matching transformer 57, constructed in the form of a hybrid transformer and causing the decoupling of the channel groups 8, 9 and 7, 10, associated with the central group-frequency bands and with the extreme group-frequency bands. The treatment of the telegraphic signals on the receiver side is reciprocal relative to that on the transmitter side.

According to the invention the individual channels associated with the central group-frequency bands in this receiving system are provided with channel filters 25, 26 tuned to carrier-wave frequencies lying within these frequency bands, these filters being directly coupled with the input of the receiver, whilst the individual channels associated with the lower extreme frequency band comprise the channel filters 24, tuned to the carrier-wave frequencies of 1860 C./S. to 2460 C./S. in the higher central frequency band, these individual channels being connected to the output circuit of a group demodulator 58 and a group oscillator 59 associated herewith, supplying a frequency exceeding the central frequency bands, the input circuit of this group demodulator 58 being connected through a group filter 60, having a passband corresponding to the lower extreme frequency band, to the input of the receiver, whilst the individual channels associated with the higher extreme frequency band comprise channel filters 27, tuned to carrier-wave frequencies of 1140 C./S. to 1740 C./S. lying within the lower central frequency band, these individual channels being connected to the output circuit of a group demodulator 61 and a group oscillator 62, associated herewith, supplying a frequency exceeding the central frequency bands, the input circuit of the group demodulator 61 being connected through a group filter 63, having a passband corresponding to the higher extreme frequency band, to the input of the receiver.

In this arrangement the channel groups 7, 10 associated with the extreme frequency bands are identical with the channel groups 9, 8, associated with the central frequency bands, i. e. the carrier-wave frequencies of 420 C./S. to 1020 C./S. and 2580 C./S. to 3180 C./S. respectively are transmitted by group demodulation with a group carrier-wave frequency of 2880 C./S. and 4320 C./S. respectively to the central carrier-wave frequencies of 1860 C./S. to 2460 C./S. and 1140 C./S. to 1740 C./S. respectively.

In the arrangements shown the group demodulators 58, 61 are constructed in the form of ring modulators, comprising four rectifiers 64 to 67 and 68 to 71 respectively, connected between the ends of the secondary windings of the input transformers 72 and 73 respectively and the ends of the primary windings of the output transformers 74 and 75 respectively, the central tappings of the said transformer windings having supplied to them the output voltages of the group oscillators 59 and 62 respectively, having frequencies of 2880 C./S. and 4320 C./S. respectively, whilst the primary windings of the input transformers 72 and 73 respectively are coupled with the output circuits of the group filters 60 and 63 respectively. Then the output voltages of the ring modulators 58 and 61 are supplied through amplifiers 76 and 77 respectively for further treatment in the channel apparatus, to the channel groups 7 and 10 respectively.

Across the input circuit of the ring modulator 58 there occur the desired channel frequencies of 420 C./S. to 1020 C./S. and also the telegraphic signals of the further channels, attenuated by the group filter 60, the channel frequencies in the band of 1860 C./S. to 2460 C./S. being undesirable, since these frequencies correspond to the tuning frequencies of the channel filters 24 of the channel group 7. The frequency interval between these undesired frequencies and the passband of the group filter 60 is sufficient for a simple group filter to provide an appreciable attenuation of for example 30 to 40 db; these undesired frequencies are moreover subjected to the additional attenuation in the ring modulator 58 of for example 20 to 25 db.

In a similar manner as described above the output circuit of the group demodulator 61 for the higher extreme frequency band has produced across it the channel frequencies associated with this channel group, these frequencies being treated further in the channel arrangement.

It results herefrom that in the telegraphy system shown the employed channel filters and group filters are particularly simple.

Figures 2, 4:
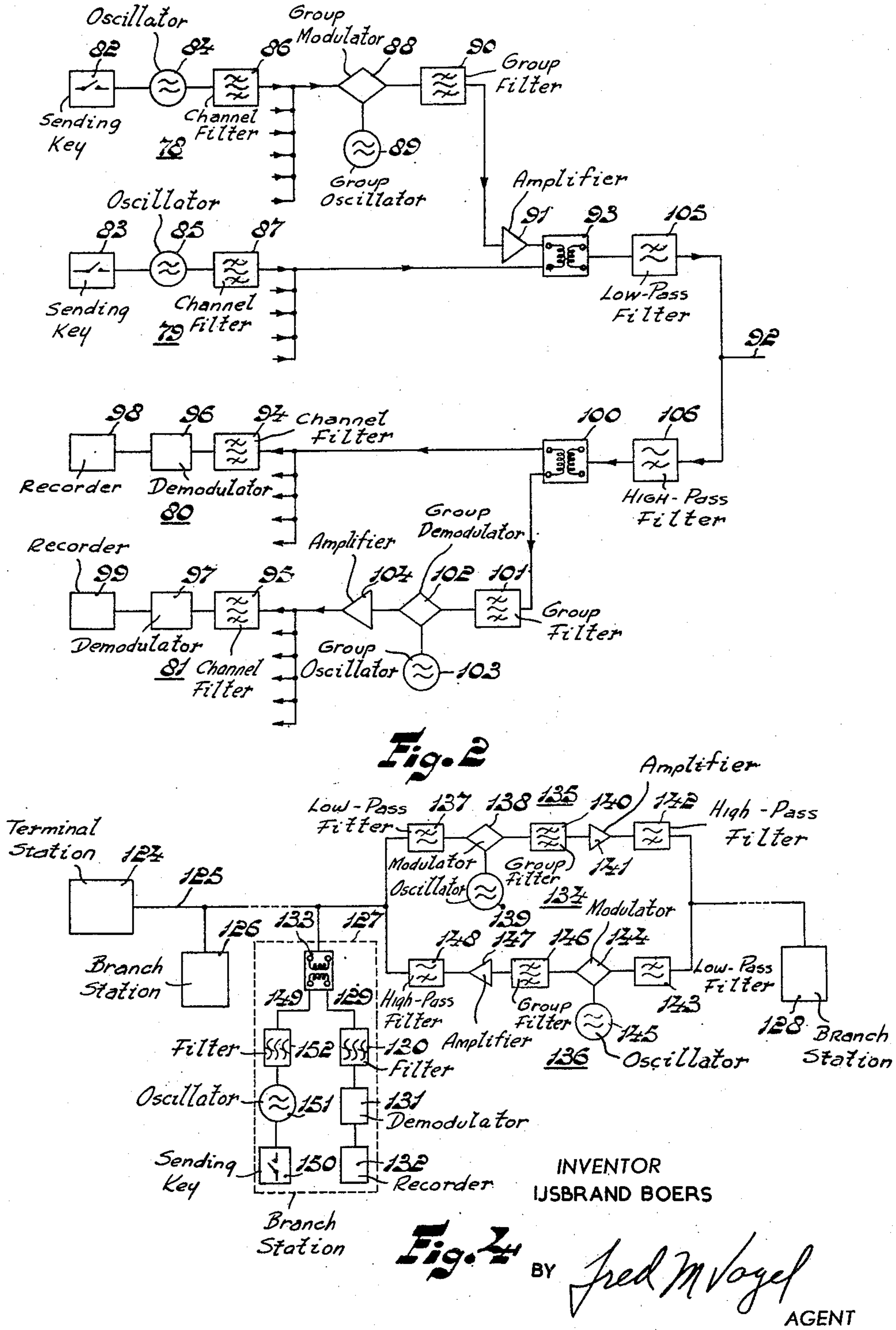
Fig. 2 shows a terminal station of a telegraphy system according to the invention, provided for duplex communication through a two-wire link.
Fig. 4 shows a telegraphy system for duplex communication between a terminal station and various branch stations lying in the transmission path and Fig. 5 shows a few frequency diagrams to explain the apparatus shown in Figs. 1 to 4.

Fig. 2 shows a terminal station of a carrier-wave system for duplex communication through a two-wire cable according to the invention, comprising four channel groups 78 to 81, lying in successive group-frequency bands, the groups 78 and 79, having the lower carrier-wave frequencies being used for forward communication and the groups 80 and 81, having the higher carrier-wave frequencies being used for the backward communication. In the figure the first channel of each of the transmitting and the receiving channel groups is shown.

Each transmitting channel comprises a sending key 82, 83, an oscillator 84, 85 and a channel filter 86, 87, the oscillators 85 of the channel group 79 of the lower central group-frequency band supplying directly the carrier-wave frequencies lying in this frequency band, whilst the oscillators 84, associated with the individual channels of the group 78 supply frequencies lying within the higher central frequency band, these individual channels being connected to a group modulator 88, constructed in the form of a ring modulator and to a group oscillator 89, associated therewith, supplying a carrier-wave frequency exceeding the central frequency bands, the output circuit of the group modulator 88 being connected to a group filter 90, having a passband corresponding to the lower extreme frequency band. The output voltage of the group filter 90 is supplied, subsequent to amplification in an amplifier 91, together with the output voltage of the channel group 79, to a transmission lead 92 through a matching transformer 93, constructed in the form of a hybrid transformer.

The receiving channels comprise each a channel filter 94, 95, a demodulator 96, 97, a recording device 98, 99, the channel filters 94 of the group 80 being tuned to the carrier-wave frequencies of the higher central frequency band, whilst the channel filters 95 of the channel group 81 are tuned to the carrier-wave frequencies of the lower central frequency band. The incoming signals are supplied directly through an input transformer 100 to the channel group 80 and to the channel group 81 through a group demodulator, which is constituted by the cascade connection of a group filter 101, connected to the transformer 100, having a passband corresponding to the higher extreme frequency band, a group demodulator 102, constructed in the form of a ring modulator with the group oscillator 103, supplying a frequency exceeding the central frequency bands and an output amplifier 104.

In order to avoid disturbing reaction between the transmitting channels and the receiving channels, which exhibit a strong relative level difference, the transformers 93, 100 are connected to the transmission lead 92 through a directional filter comprising a low-pass filter 105 and a high-pass filter 106. The frequency space required for carrying out this measure between the transmitting channels and the receiving channels is obtained by omitting the transmitting channel having the higher carrier-wave frequency (1740 C./S.) and the receiving channel having the lower carrier-wave frequency (1860 C./S.). The frequency interval thus obtained permits the use of a very simple directional filter.

Figure 5:
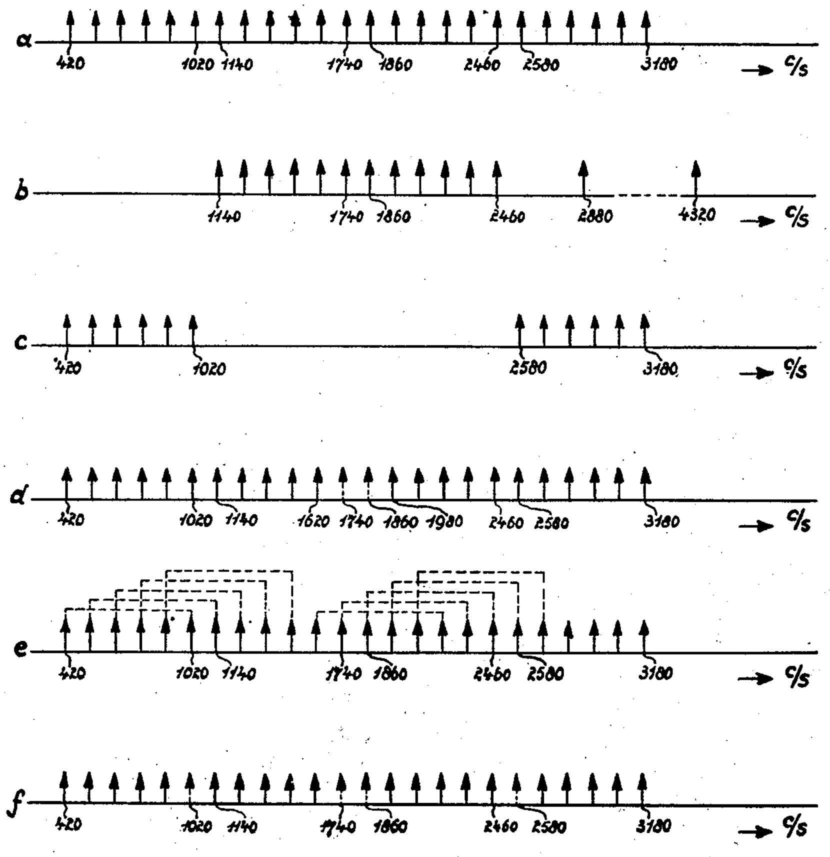

Fig. 5*d* shows the positions of the transmitting and receiving carrier waves, to which the numerical examples of the embodiment shown in Fig. 1 are applied.

For the transmission use is made of six channels of 420 C./S. to 1020 C./S. of the lower extreme group and five channels of 1140 C./S. to 1620 C./S. of the lower central group, whereas for the reception use is made of six channels having frequencies from 2580 C./S. to 3180 C./S. of the higher extreme group and five channels from 1980 C./S. to 1620 C./S. of the higher central group. The channels having the carrier-wave frequencies of 1740 C./S. and 1860 C./S. (indicated in broken lines) associated with the central channel groups are omitted.

Figure 3:
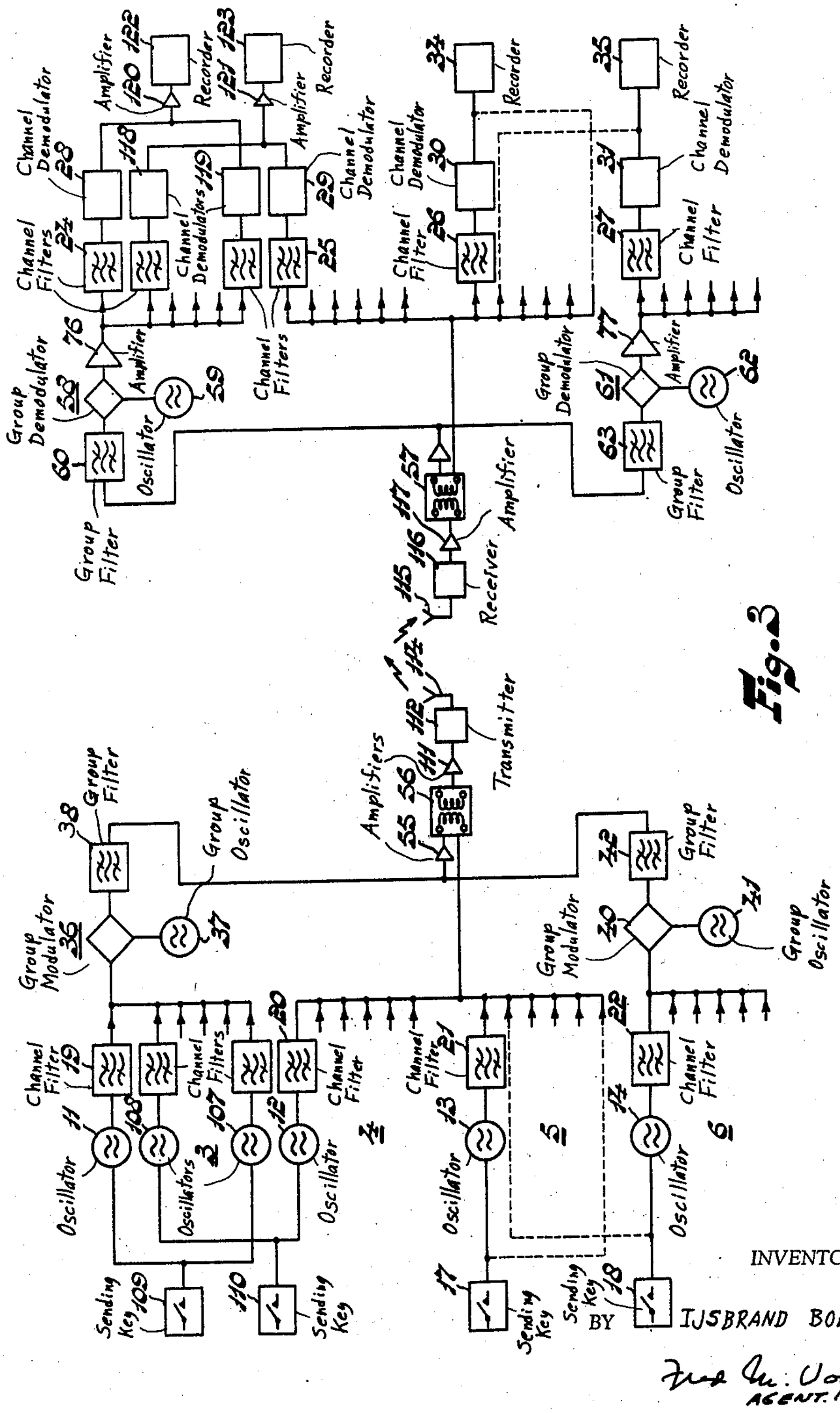
Fig. 3 shows a telegraphy system according to the invention, in which a telegraphy signal is transmitted simultaneously through various telegraphy channels.

Fig. 3 shows a carrier-wave telegraphy system comprising a transmitting device and a receiving device for radio communication. In this case, in order to avoid interference owing to the suppression of a telegraphy channel, for example due to selective fading, frequency diversity is employed, i. e. one and the same telegraphic signal is conducted simultaneously through two different telegraphy channels, which differ for example by 480 C./S.

The construction of the carrier-wave telegraphy system used corresponds substantially to the embodiment shown in Fig. 1. Corresponding elements are designated by the same reference numerals.

In this embodiment on the transmitter side the channel oscillators 11, 107; 12, 108, associated with telegraphy channels having a frequency difference of 600 C./S. are controlled simultaneously by the same transmitting key 109 and 110 respectively. Fig. 5*e* shows the frequency diagram of the carrier-wave frequencies; herein the carrier-wave frequencies related to one another by broken lines serve to transmit one and the same telegraphy signal.

The telegraphy signals thus obtained are supplied to an output transformer 56, which is connected through an amplifier 111, to a transmitting device 112, comprising a transmitting aerial 114.

On the receiver side the signals taken from a receiving aerial 115 are supplied to a receiver 116 comprising a demodulation device, the output voltage of which is supplied, subsequent to amplification in an amplifier 117, to the receiver transformer 57 for further treatment in the channel system.

In this arrangement the output voltages of the channel demodulation devices 28, 119 and 29, 118 respectively, across the output circuits of which the same telegraphic signals occur, are supplied to the input circuit of an amplifying stage 120 and 121 respectively, connected to a common recording device 122 and 123 respectively.

Then interference due to the suppression of a channel, for example, due to selective fading, is practically avoided.

Fig. 4 shows a device according to the invention for duplex communication between a terminal station 124 and various branch stations 126, 127, 128 and so on arranged on a two-wire cable; the terminal station 124 (shown in blocks) corresponds to the terminal station referred to in the description of Fig. 2.

The constructions of the branch stations 126, 127, 128, and so on are identical and comprise each a comparatively small number of transmitting receiving channels; the figure shows in detail only the branch station 127.

The branch station 127 comprises a transmitting channel 149 and a receiving channel 129, the transmitting channel comprises a sending key 150, an oscillator 151 and a channel filter 152; the receiving channel 129 comprises a channel filter 130, a demodulating device 131 and a recording device 132. The branch station is connected to the two-wire cable with the aid of a transformer 133, having a high transformation ratio, since a high input impedance of the branch station has the advantage that the transmission properties of the two-wire system 125 are affected to a minimum.

The terminal station 124 communicates with the nearest branch stations 126, 127 for the forward communication from the station 124 in the lower central frequency band (1140 C./S. to 1740 C./S.) and for the backward communication in the higher central frequency band (1860 C./S. to 2460 C./S.); the transmitting frequencies and receiving frequencies of the branch station 127 may, for example, be 1260 C./S. and 2340 C./S. respectively.

For the more remote branch stations use is made of the lower extreme frequency and the higher extreme frequency band; thus in each of these branch stations use had to be made of group transposition to obtain satisfactory results with the available individual transmitting and receiving channel types for carrier-wave frequencies in the central frequency bands.

A material economy in apparatus is obtained by providing a frequency transposition unit 134 after the tapping of the carrier-wave frequencies of the central group-frequency bands from the two-wire cable, this unit transposing the extreme group frequency bands used for duplex communication with the remoter branch stations 128 into the central group frequency bands.

The transposition unit shown in the figure comprises two parallel branches 135 and 136 for the forward and the backward communication respectively. The branch 135 for forward communicating comprises in succession a low-pass filter 137, passing the lower extreme frequency band, a ring modulator 138 with an oscillator 139 producing a frequency of 2880 C./S., a group filter 140, having a passband corresponding to the higher central frequency band, an amplifier 141 and a high-pass filter 142, connected to the output of the amplifier and passing the higher central frequency band. The branch 136 for the backward communication comprises the cascade connection of a low-pass filter 143, passing the lower central frequency band, a ring modulator 144 with an oscillator 145, supplying a frequency of 4320 C./S., a group filter 146 having a passband corresponding to the higher extreme frequency band, an amplifier 147 and a high-pass filter 148, connected to the output of the amplifier and passing the higher extreme frequency band. The assembly of the low-pass and the high-pass filters 137, 148, 142, 143 at the ends of the branches 135, 136 respectively operate herein as directional filters for the forward and the backward communication.

Under certain conditions, more particularly for a simple construction of the directional filters, it may be of importance to omit the channels (cf. Fig. 5*f*) having the lower frequency of the higher extreme frequency band (2580 C./S.) and having the higher frequency of the lower extreme frequency band (1020 C./S.).

What is claimed is:

1. A carrier-wave telegraphy system comprising a plurality of frequency channels lying in a speech-frequency band, said channels being arranged in four frequency groups lying in four successive group-frequency bands thereby to form a low-frequency band, a lower central-frequency band, a higher central-frequency band, and a high-frequency band, transmitter apparatus having an output circuit and comprising a plurality of channel oscillators associated respectively with each of said frequency channels, the channel oscillators associated with the channels in said low-frequency and higher central-frequency bands having frequencies lying in the channels of said higher central-frequency band, and the channel oscillators associated with the channels in said high-frequency and lower central-frequency bands having frequencies lying in the channels of said lower central-frequency band, a plurality of channel filters connected respectively between the channel oscillators of said central-frequency bands and said output circuit and tuned respectively to the frequencies of the last-named channel oscillators, a low-band group modulator comprising a signal-mixing circuit and a group oscillator for producing oscillations having a frequency higher than the frequency range of said central-frequency bands, a plurality of channel filters connected respectively between the channel oscillators associated with said low-frequency band and said mixing circuit and tuned respectively to the frequencies of the last-named channel oscillators, means for feeding oscillations from said group oscillator to said mixing circuit whereby said group modulator converts the oscillations of the channel oscillators associated with said low-frequency band into oscillations falling respectively in the frequency channels of said low-frequency band, a group filter having a passband for said low-frequency band and connected between the output of said group modulator and said output circuit, a high-band group modulator comprising a signal-mixing circuit and a group oscillator for producing oscillations having a frequency higher than the frequency range of said central-frequency bands, a plurality of channel filters connected respectively between the channel oscillators associated with said high-frequency band and the last-named mixing circuit and tuned respectively to the frequencies of the last-named channel oscillators, means for feeding oscillations from the last-named group oscillator to said mixing circuit whereby the last-named group modulator converts the oscillations of the channel oscillators associated with said high-frequency band into oscillations falling respectively in the frequency channels of said high-frequency band, and a group filter having a passband for said high-frequency band and connected between the output of said last-named group modulator and said output circuit.

2. A system as claimed in claim 1, in which each of said group modulators is constructed in the form of a ring modulator, thereby to attenuate undesired modulation frequencies occurring within said central-frequency bands.

3. A system as claimed in claim 1, including a receiver comprising an input circuit coupled to said output circuit, a plurality of signal-responsive devices associated respectively with said frequency channels, a plurality of channel filters connected between said input circuit and said devices which are associated with the frequency channels of said central-frequency bands, said last-named filters being tuned to the respective frequencies of said last-named frequency channels, a low-band group demodulator comprising a signal-mixing circuit and an oscillator for producing oscillations having a frequency higher than the frequency range of said central-frequency bands, a group filter having a passband for said low-frequency band and connected between said input circuit and said group demodulator, means for feeding oscillations from the last-named oscillator to said group demodulator whereby said group demodulator converts the oscillations of said low-frequency band into oscillations falling respectively in the frequency channels of said higher central-frequency band, a plurality of channel filters connected respectively between the output of said group demodulator and said devices which are associated with said low-frequency band and tuned respectively to the frequency channels of said higher central-frequency band, a high-band group demodulator comprising a signal-mixing circuit and an oscillator for producing oscillations having a frequency higher than the frequency range of said central-frequency bands, a group filter having a pass-band for said high-frequency band and connected between said input circuit and said high-band group demodulator, means for feeding oscillations from the last-named oscillator to said high-band group demodulator whereby said high-band group demodulator converts the oscillations of said high-frequency band into oscillations falling respectively in the frequency channels of said lower central-frequency band, and a plurality of channel filters connected respectively between the output of said high-band group demodulator and said devices which are associated with said high-frequency band and tuned respectively to the frequency channels of said lower central-frequency band.

4. A system as claimed in claim 3, in which each of said group demodulators is constructed in the form of a ring demodulator, thereby to attenuate undesired demodulation frequencies occurring within said central-frequency bands.

5. A system as claimed in claim 3, in which the frequency bandwidths of the frequency channels of said lower central-frequency band and said high-frequency band are identical, and in which the frequency bandwidths of the frequency channels of said higher central-frequency band and said low-frequency band are identical.

6. A system as claimed in claim 5 and adapted foi duplex communication, in which communication in one direction is provided by the transmitter and receiver apparatus for the frequency channels of said high-frequency band and said higher central-frequency band, and in which communication in the other direction is provided by the transmitter and receiver apparatus for the frequency channels of said low-frequency band and said lower central-frequency band, and including a high-pass filter connected jointly to the channel circuits of said high-frequency and higher central-frequency bands and a low-pass filter connected jointly to the channel circuits of said low-frequency and lower central-frequency bands.

7. A system as claimed in claim 3, including a sending key connected to actuate simultaneously a plurality of said channel oscillators, and including a reproducing device connected to be actuated by a plurality of said signal-responsive devices which are associated with frequency channels corresponding to the frequency channels with which said last-named plurality of channel oscillators are associated.

8. A system as claimed in claim 11, comprising a transmission cable connected to said output circuit, a pair of relatively near branch stations coupled to said cable at points relatively near said transmitter apparatus and adapted to operate respectively in said lower central-frequency band and in said higher central-frequency band, and a pair of relatively distant branch stations coupled to said cable at points relatively distant from said transmitter apparatus and adapted to operate respectively in said low-frequency band and in said high-frequency band, and a transposition unit connected electrically in said cable between said relatively near and distant pairs of branch stations and comprising two parallel-connected branches, one of said branches comprising a cascade connection of a low-pass filter for passing frequencies of said low-frequency band, a modulating circuit comprising a modulator and an oscillator coupled thereto, said oscillator having an oscillation frequency higher than the frequency range of said central-frequency bands, and a group filter having a frequency pass band corresponding to said higher central-frequency band, and the other of said branches comprising a cascade connection of a high-pass filter for passing frequencies of said high-frequency band, a modulating circuit comprising a modulator and an oscillator coupled thereto, said last-named oscillator having an oscillation frequency higher than the frequency range of said central-frequency bands, and a group filter having a frequency pass band corresponding to said lower central-frequency band.

9. A system as claimed in claim 8, for duplex communication, in which a high-pass directional filter for passing said higher central-frequency band is connected in the cascade of said one branch of said transposition unit at the end thereof remote from said transmitter apparatus, and in which a low-pass directional filter for passing said lower central-frequency band is connected in the cascade of said other branch of said transposition unit at the end thereof remote from said transmitter apparatus.

References Cited in the file of this patent

UNITED STATES PATENTS

| | | |
|---|---|---|
| 2,374,567 | Taylor | Apr. 24, 1945 |
| 2,662,933 | Singer | Dec. 15, 1953 |